US012437735B2

United States Patent
Li et al.

(10) Patent No.: US 12,437,735 B2
(45) Date of Patent: Oct. 7, 2025

(54) BEATBOXING TRANSCRIPTION

(71) Applicant: Lemon Inc., Grand Cayman (KY)

(72) Inventors: Bochen Li, Los Angeles, CA (US); Rodrigo Castellon, Los Angeles, CA (US); Daiyu Zhang, Los Angeles, CA (US); Jitong Chen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 817 days.

(21) Appl. No.: 17/688,382

(22) Filed: Mar. 7, 2022

(65) Prior Publication Data

US 2023/0282188 A1     Sep. 7, 2023

(51) Int. Cl.
*G10H 1/00* (2006.01)
*G10L 25/18* (2013.01)
*G10L 25/30* (2013.01)

(52) U.S. Cl.
CPC ......... *G10H 1/0008* (2013.01); *G10H 1/0066* (2013.01); *G10L 25/18* (2013.01); *G10L 25/30* (2013.01); *G10H 2210/005* (2013.01); *G10H 2210/056* (2013.01); *G10H 2210/086* (2013.01); *G10H 2250/311* (2013.01)

(58) Field of Classification Search
CPC ............... G10H 1/0008; G10H 1/0066; G10H 2210/005; G10H 2210/056; G10H 2210/086; G10H 2250/311; G10L 25/18; G10L 25/30
USPC .......................................................... 84/645
See application file for complete search history.

(56) References Cited

U.S. PATENT DOCUMENTS

| | | | |
|---|---|---|---|
| 2013/0072270 A1* | 3/2013 | Majchrowicz | G10L 25/48 463/7 |
| 2016/0133240 A1* | 5/2016 | Cartwright | G06F 16/683 84/601 |
| 2018/0357989 A1* | 12/2018 | Goren | G09B 15/009 |
| 2019/0019529 A1* | 1/2019 | Niedermeier | H04R 3/04 |
| 2019/0392802 A1* | 12/2019 | Higurashi | G06N 20/00 |
| 2020/0074982 A1* | 3/2020 | McCallum | G06N 3/08 |

(Continued)

FOREIGN PATENT DOCUMENTS

EP      2400488 B1 *   9/2017   ............. G10H 1/16

OTHER PUBLICATIONS

Chih-Wei Wu et al., "A Review of Automatic Drum Transcription," in IEEE/ACM Transactions on Audio, Speech, and Language Processing, vol. 26, No. 9, pp. 1457-1483, Sep. 2018, doi: 10.1109/TASLP.2018.2830113. (Year: 2018).*

(Continued)

*Primary Examiner* — Christina M Schreiber
(74) *Attorney, Agent, or Firm* — Faegre Drinker Biddle & Reath LLP

(57) ABSTRACT

Methods, systems, and storage media for generating a beatbox transcript are disclosed. Some examples may include: receiving an audio signal having a plurality of beatbox sounds, generating a spectrogram of the audio signal, processing the spectrogram of the audio signal with a neural network model trained on training samples including beatbox sounds, generating, by the neural network model a beatbox sound activation map including a plurality of activation times for a plurality of beatbox sounds, decoding the beatbox sound activation map into a beatbox transcript and providing the beatbox transcript as an output.

20 Claims, 10 Drawing Sheets

(56) References Cited

U.S. PATENT DOCUMENTS

| | | | | |
|---|---|---|---|---|
| 2021/0248983 | A1* | 8/2021 | Balassanian | G06N 7/01 |
| 2022/0036915 | A1* | 2/2022 | Koretzky | G10L 25/54 |
| 2022/0079511 | A1* | 3/2022 | Quatieri | G10L 25/24 |
| 2023/0197043 | A1* | 6/2023 | Martinez Ramirez | G10H 1/0091 |
| | | | | 381/61 |
| 2023/0282188 | A1* | 9/2023 | Li | G10L 25/18 |
| | | | | 84/645 |
| 2023/0360619 | A1* | 11/2023 | Li | G10H 1/0066 |
| 2024/0194086 | A1* | 6/2024 | Parmenter | G09B 5/04 |

OTHER PUBLICATIONS

Chih-W. Wu et al., "A Review of Automatic Drum Transcription". IEEE/ACM Transactions on Audio, Speech, and Language Processing, Sep. 30, 2018, vol. 26, No. 9, pp. 1457-1483 [Retrieved on Aug. 23, 2023] <DOI: 10.1109/TASLP.2018.2830113> pp. 1457-1460, 1466-1467.

Liu Lele, et al., "From audio to music notation". Handbook of Artificial Intelligence for Music: Foundations, Advanced Approaches, and Developments for Creativity (2021): Chapter 24, p. 1-23. Dec. 31, 2021 [Retrieved on Aug. 24, 2023 from https://link.springer.com/chapter/10.1007/978-3-030-72116-9_24].

Mukhutdinov D., "Deep Feature Extraction and Music Language Modelling for Amateur Vocal Percussion Transcription", Master of Science Artificial Intelligence School of Informatics University of Edinburgh (2020): pp. 1-53. Dec. 31, 2020 [Retrieved on Aug. 24, 2023 from https://projectarchive.

Delgado A., et al., "Learning Models for Query by Vocal Percussion: A Comparative Study" arXiv preprint arXiv:2110.09223 (2021). Oct. 18, 2021. [Retrieved on Aug. 24, 2023 from https://arxiv.org/abs/2110.09223] Whole document, in particular part 1.

International Search Report mailed Sep. 4, 2023 for PCT/SG2023/050129.

* cited by examiner

BEATBOXING TRANSCRIPTION

BACKGROUND

Beatboxing is a form of vocal percussion primarily involving the art of simulating drum machines, using one's mouth, lips, tongue, and voice. While Beatboxing may have originated with hip-hop culture, beatboxing can be found in other genres of music as well. Beatboxing is sometimes used to refer to vocal percussion in general. The field of automated music transcription has been applied to various music compositions and instructions; however, the study of the transcription of beatboxing has been rather limited.

Music transcription is a core music information retrieval task with an objective to computational understand events in music. That is, music transcription is a process that identifies musical events, such as notes, sounds, and rests in a given audio clip, and generates a human readable transcript, such as a score. Previous work has explored applying music transcription techniques to common instruments like piano, guitar, drums, and string or woodwind instruments, having vast amounts of datasets available for analysis. However, work has been limited with respect to applying music transcription techniques to beatbox performances. That is, significant challenges exist with respect to beatbox performances and audio clips; more specifically, the acoustic feature of beatbox samples vary person to person, making the idea of learning some sort of standard nearly impossible, and the available dataset that includes beatbox performances is very limited.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, at least one aspect relates to a method for generating a beatbox transcript. The method may include receiving an audio signal having beatbox sounds, wherein the beatbox sounds include beatbox vocals; generating a spectrogram of the audio signal; generating a beatbox sound activation map including a plurality of activation times for a plurality of beatbox sounds based on the spectrogram of the audio signal; decoding the beatbox sound activation map into a beatbox transcript; and providing the beatbox transcript as an output, wherein the beatbox transcript includes instrumental music matching the beatbox sound activation map.

In accordance with examples of the present disclosure, a system including one or more hardware processors configured by machine-readable instructions is described. The one or more hardware processors may be configured to receive an audio signal having a plurality of beatbox sounds, wherein the beatbox sounds include beatbox vocals; generate a spectrogram of the audio signal; process the spectrogram of the audio signal with a neural network model trained on training samples including beatbox sounds; generate, by the neural network model a beatbox sound activation map including a plurality of activation times for a plurality of beatbox sounds based on the spectrogram of the audio signal; decode the beatbox sound activation map into a beatbox transcript; and provide the beatbox transcript as an output, wherein the beatbox transcript includes instrumental music matching the beatbox sound activation map.

In accordance with examples of the present disclosure, a non-transient computer-readable storage medium comprising instructions being executable by one or more processors is described. The instructions, when executed by the one or more processors, cause the one or more processors to: receive an audio signal having a plurality of beatbox sounds, wherein the beatbox sounds include beatbox vocals; generate a spectrogram of the audio signal; process the spectrogram of the audio signal with a neural network model trained on training samples including beatbox sounds; generate, by the neural network model a beatbox sound activation map including a plurality of activation times for a plurality of beatbox sounds based on the spectrogram of the audio signal; decode the beatbox sound activation map into a beatbox transcript; and provide the beatbox transcript as an output, wherein the beatbox transcript includes instrumental music matching the beatbox sound activation map.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
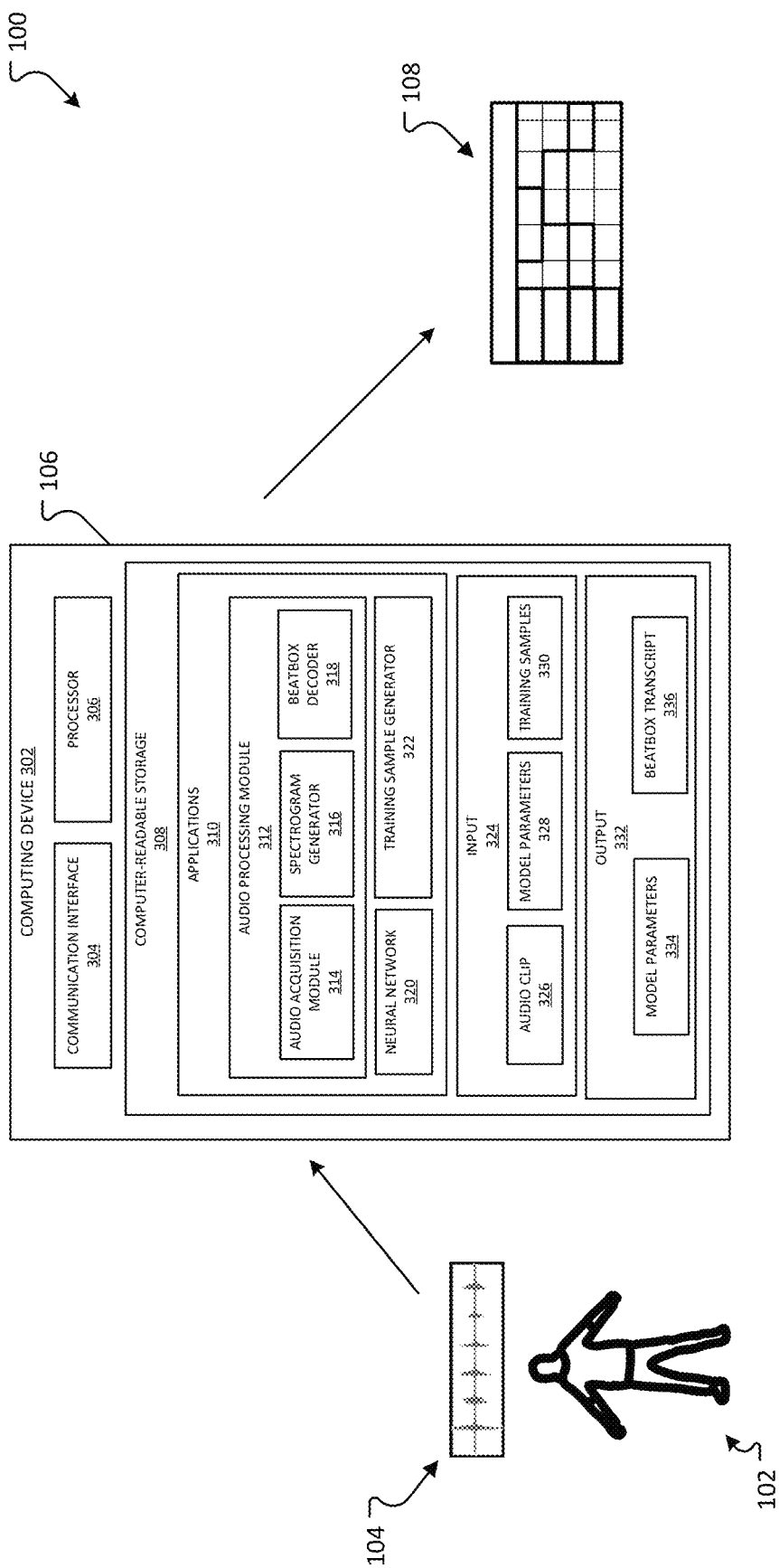
FIG. 1 depicts a first example of an automatic beatbox transcription system in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As previously discussed, beatboxing is a form of vocal percussion primarily involving the art of mimicking drum machines, using one's mouth, lips, tongue, and voice. While the field of automated music transcription has been applied to various music compositions and instructions, the study of the transcription of beatboxing has been rather limited. While previous work has explored applying music transcription techniques to common instruments like piano, guitar, drums, and string or woodwind instruments, work has been limited with respect to applying music transcription techniques to beatbox performances. That is, significant challenges exist with respect to beatbox performances and audio clips; more specifically, the acoustic feature of beatbox samples vary person to person, making the idea of learning some sort of standard nearly impossible, and the available dataset that includes beatbox performances is very limited.

In accordance with examples of the present disclosure, systems and methods are described for obtaining training data needed to train one or more neural network models, for training the neural network model, and then using the trained neural network model to transcribe audio clips that include beatboxing music. In examples training data may be obtained by synthesizing beatbox transcriptions from individual beatbox samples, and then applying an augmentation process to the individual beatbox samples to expand the dataset. A neural network may then be trained using the synthesized training data such that input audio clips including beatboxing audio recordings may be used to generate beatbox transcriptions as output containing time instances of beatboxing, or drum, events. Examples of such events may include, but is not limited to kick, snare, hi-hat, etc. Accordingly, a trained machine learning model may be utilized to predict or otherwise transcribe drum events from beatbox recordings.

In examples, a transcript of beatbox recordings may be output as a "piano roll." A traditional "piano roll" generally refers to a virtual grid representing time on the horizontal axis and MIDI notes on the vertical axis, where the piano roll includes an entire range of notes such that one or more sounds, effects, beats, frames, can be reproduced, often in a digital audio workstation (DAW). With respect to beatboxing, the "piano roll" may refer to a virtual grid representing time on the horizontal axis and specific activations of specific beatbox sounds on the vertical axis (e.g., kick, snare, hi-hat etc.). The transcript may be used to recreate the beatboxing music either by another human, or by other synthesis means. For example, a transcript may be converted to or otherwise be accessed in MIDI format such that a computing system may recreate the beatbox based on the transcript alone. Alternatively, or in addition, the beatboxing transcript may be in the form of standard beatbox notation (SBN). In examples, SBN is enclosed in curly brackets and may include a plurality of English letters depending on a desired beatbox sound. For example, {B} is an example of a single beatbox sound, while {B tkt} may be indicative of a plurality of beatbox sounds, for example, a triplet. In some instances, a sound may be aspirated or an ejective sound. Ejective sounds are made outwards without breathing. Sounds that are made while breathing out are called aspirated sounds.

FIG. 1 depicts a first example of an automatic beatbox transcription system 100 in accordance with examples of the present disclosure. In examples, a user 102 may generate a plurality of beatbox sounds generally contained in an audio clip 104. The audio clip 104 may be provided to a computing device 106, where the computing device 106 may process the audio clip 104 and generate a beatbox transcript 108. Alternatively, or in addition, an audio acquisition interface of the computing device 106 may receive an audio signal directly from the user 102. For example, the audio acquisition interface may refer to an interface for receiving audio signals, such as a microphone. The computing device 106 may process the received audio signal and generate a beatbox transcript 108. In accordance with examples of the present disclosure, the computing device 106 may be a personal computing device, such as a mobile smartphone, tablet or otherwise and may process the audio clip 104 or audio signal directly to generate the beatbox transcript 108. Alternatively, or in addition, the computing device may be a server or otherwise accessible via a network connection such that the computing device 106 receives the audio clip 104 from another computing device, processes the audio clip 104, and provides the beatbox transcript 108 to another computing device or otherwise stores and makes accessible the beatbox transcript to other computing devices. Thus, the automatic beatbox transcription system 100 may include the computing device 106 associated with the user 102 and/or a server that is communicatively coupled to the computing device 106 via a network. The network may include any kind of computing network including, without limitation, a wired or wireless local area network (LAN), a wired or wireless wide area network (WAN), and/or the Internet.

In examples, the computing device 106 may be configured to process the received audio clip utilizing a neural network. Prior to being processed by a neural network, the audio clip 104 and/or audio signal may first be pre-processed or otherwise converted into a spectrogram. A spectrogram is a visual representation of the spectrum of frequencies of a signal as it varies with time. In examples, the spectrogram may be created utilizing the audio clip 104 or audio signal a time-domain signal in one of two ways: approximated as a filter bank that results from a series of band-pass filters, or calculated from the time signal using the Fourier transform. The result of the Creating a spectrogram using the FFT as an approximation of the Fourier transform is a digital process. Digitally sampled data, in the time domain, is broken up into chunks and is Fourier transformed to calculate the magnitude of the frequency spectrum for each chunk. Each chunk then corresponds to a vertical line in a resulting spectrogram image. The spectrogram then provides a measurement of magnitude versus frequency for a specific moment in time (the midpoint of the chunk). The resulting spectrogram may then be provided to a neural network for additional processing.

The neural network may operate on the spectrogram and generate a representation of a "piano roll," indicating activations on a time axis for various beatbox sounds. For example, the "piano roll" may include activation times for a plurality of beatbox sounds over the course of a song, frame, melody, audio signal, etc. In some examples, the "piano roll" may be output as a vector representation, in digital format, as an image, etc. As this "piano roll" of beatbox sound activations may or may not be understandable by most persons, the automatic beatbox transcription system 100 may process the "piano roll" of beatbox activations using a decoder and generate a beatbox transcript that is generally understood by most persons, may be reproduced by most persons, and/or may be utilized to synthesize beatbox sounds utilizing a DAW for example. The "piano roll" of beatbox activations may refer to a beatbox sound activation map that includes a plurality of activation times for a plurality of beatbox sounds over the course of a song, frame, melody, etc. In some examples, the transcript may be output in a MIDI format.

Figure 2:
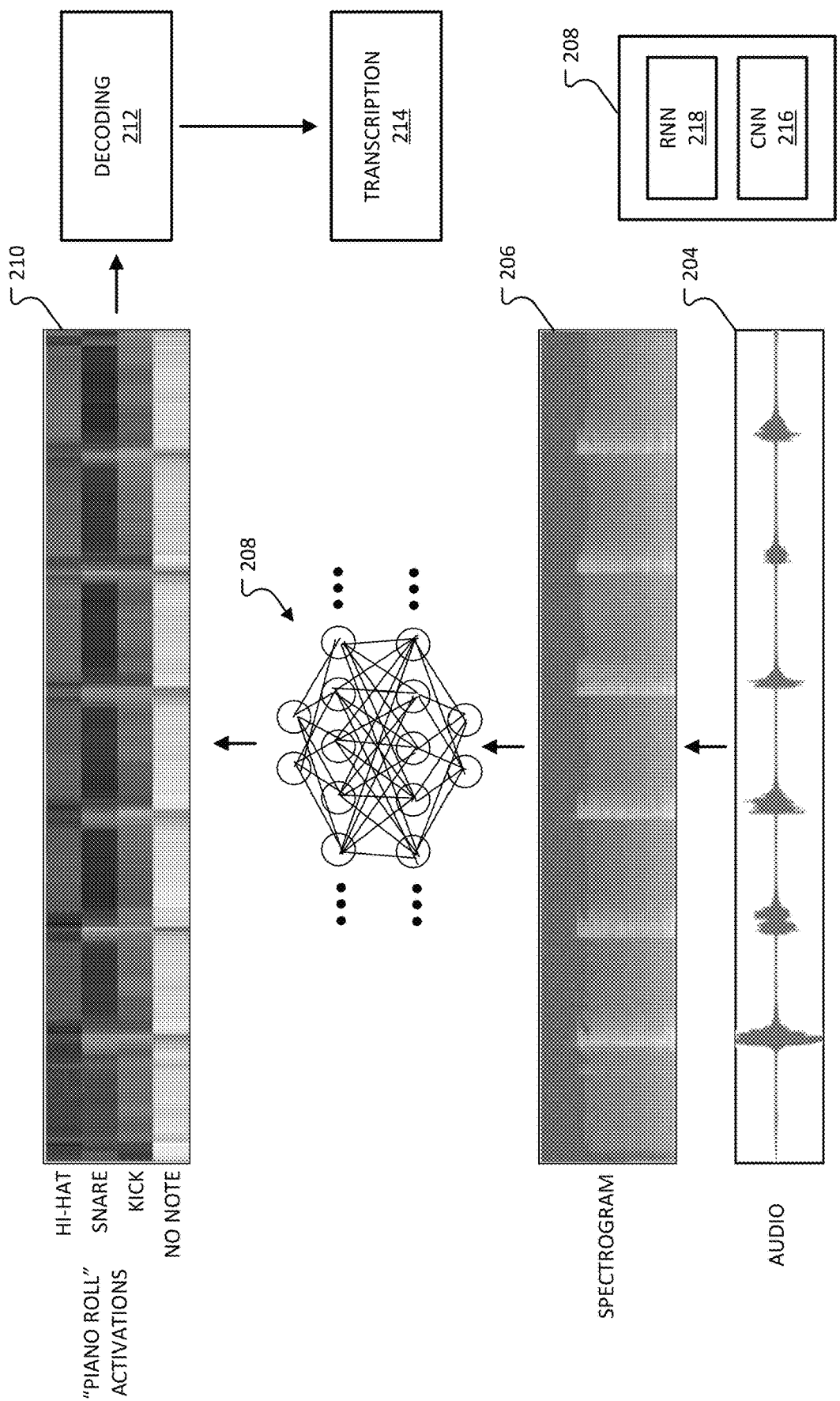
FIG. 2 depicts additional details directed to the generation of the beatbox transcript are described in accordance with examples the present disclosure.

Referring now to FIG. 2, additional details directed to the generation of the beatbox transcript are described in accordance with examples the present disclosure. As previously discussed, a spectrogram 206 may be generated from an audio clip 204, or audio signal, where the audio clip 204 may be the same as or similar to the audio clip 104 previously discussed. The spectrogram 206, may be a visual representation of the spectrum of frequencies of the audio clip 204, or audio signal, as the audio varies with time. In examples, the spectrogram 206 may be in digital format and may be further processed. For example, the spectrogram 206 may be resized, color adjusted, etc., prior to be provided to the neural network 208. In examples, the neural network 208 may include a convolutional neural network (CNN) 216 coupled with a recurrent neural network (RNN) 218.

A CNN is a class of artificial neural networks, most commonly applied to analyze visual imagery; CNNs tend to be a regularized version of multilayer perceptrons, where multilayer perceptrons generally refer to fully connected networks where each neuron in one layer is connected to all neurons in the next layer. CNNs can advantage of the hierarchical pattern in data and assemble patterns of increasing complexity using smaller and simpler patterns embossed in their filters. A CNN includes an input layer, hidden layers, and an output layer, where he hidden layers include layers that perform convolutions. As the convolution kernel slides along the input matrix for the layer, the convolution operation generates a feature map, which in turn contributes to the input of the next layer. This is followed by other layers such as pooling layers, fully connected layers, and normalization layers. An RNN is a class of artificial neural networks where connections between nodes form a directed graph along a temporal sequence. Accordingly, an RNN can exhibit temporal dynamic behavior. Derived from feedforward neural networks, RNNs can use their internal state (memory) to process variable length sequences of inputs. Although the neural network 208 is described as including a CNN 216 and/or an RNN 218, other neural networks and neural network configurations may be utilized. For example, the neural network 208 may include, but is not limited to, one or more CNN, RNN, transformer, artificial neural network (ANN), and combinations thereof.

The neural network 208 may output a "piano roll" of beatbox activations 210 as previously discussed. That is, the "piano roll" of beatbox activations 210 may refer to beatbox sound activations as determined or otherwise generated, classified, or predicted by the neural network 208. The "piano roll" of beatbox activations 210 may or may not be understandable by most persons and therefore the "piano roll" of beatbox activations 210 may be provided to the decoder 212 to generate a beatbox transcript 214 that is generally understood by most persons, may be reproduced by most persons, and/or may be utilized to synthesize beatbox sounds utilizing a DAW for example. In some examples, the transcript 214 may be output in a MIDI format.

Figure 3:
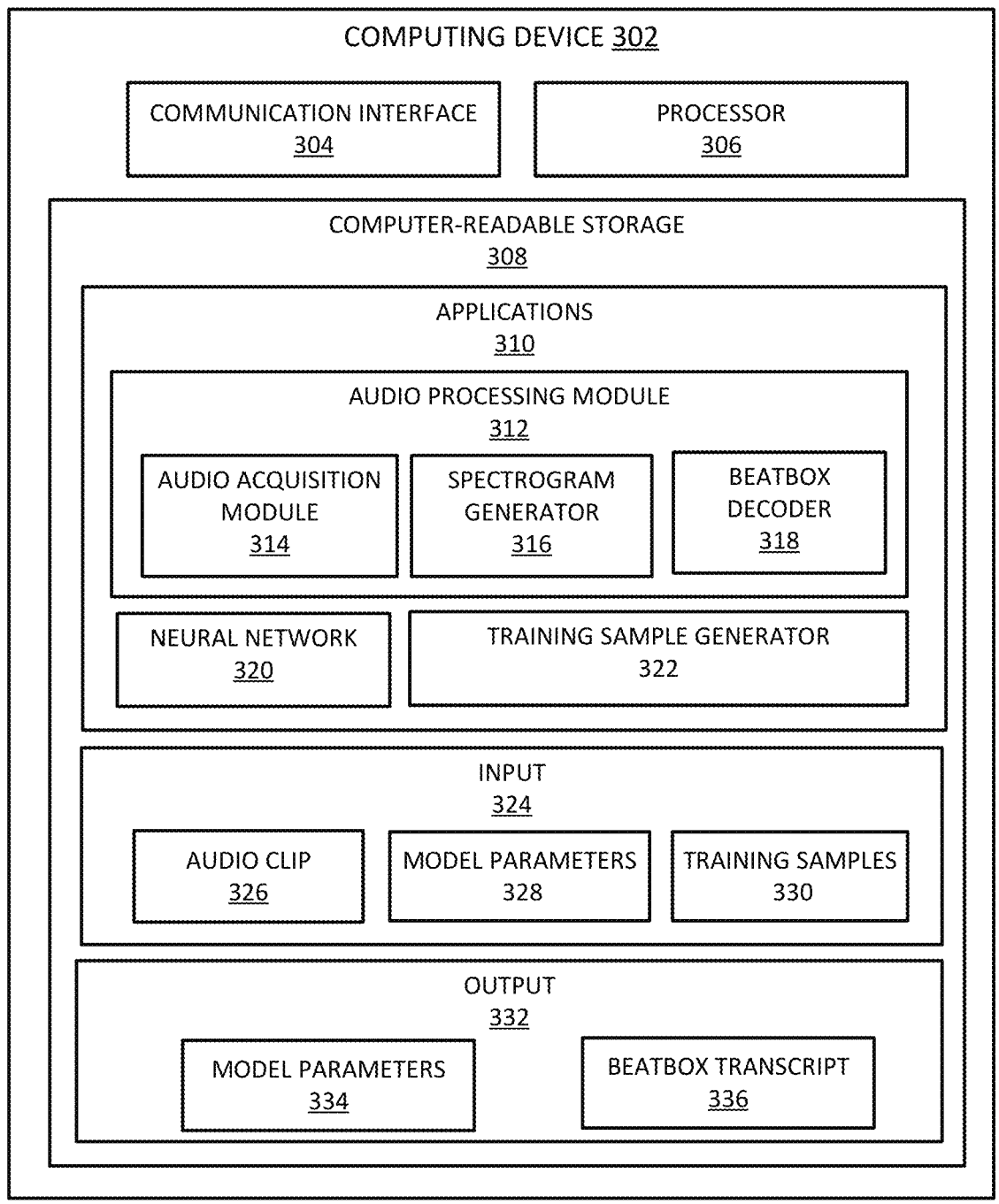
FIG. 3 depicts additional details of a computing device in accordance with examples of the present disclosure.

Referring now to FIG. 3, additional details of a computing device 302 are described in accordance with examples of the present disclosure. The computing device 302 may be the same as or similar to the computing device 106 previously described in FIG. 1. The computing device 302 may include a communication interface 304, a processor 306, and a computer-readable storage 308. In examples, the communication interface 304 may be coupled to a network and receive the audio clip 104, and in some instances, model parameters configuring a pre-trained neural network. The audio clip 104 (FIG. 1) may be stored as input 324 audio clip 326 and the model parameters or weights may be stored as model parameters 328.

In some examples, one or more training samples may be received at the communication interface 304 and may be stored as the training samples 330. The model parameters 328 may configured the neural network 320, while the training samples 330 may be utilized by the training sample generator 322 to augment the training samples received at the communication interface 304. Accordingly, the training samples received at the communication interface and the training samples generated by the training sample generator 322 may be utilized to train the neural network 320 during a neural network training operation. The resulting neural network configuration (e.g., model parameters including but not limited to weights, etc.) may be output as model parameters 334.

In examples, one or more applications 310 may be provided by the computing device 302. The one or more applications 310 may include an audio processing module 312 including an audio acquisition module 314, a spectrogram generator 316, and a beatbox decoder 318. The audio acquisition module 314 may be configured to receive, acquire, or otherwise obtain audio signals, or audio clips, such as the audio clip 104 (FIG. 1). The audio acquisition module 314 may then store the received audio clips as audio clip 326 for processing by the spectrogram generator 316. The spectrogram generator 316 may generate a spectrogram based on the audio clip 326. That is, the spectrogram generator 316 may generate a visual representation of the spectrum of frequencies of an audio signal in the audio clip 326 as the audio signal varies with time. The resulting spectrogram may then be provided to a neural network 320 for additional processing. The neural network 320 may be the same as or similar to the neural network 208 previously described. Thus, the neural network 320 may generate a "piano roll" of beatbox activations and provide the "piano roll" of beatbox activations to the beatbox decoder 318 such that a transcript can be generated. That is, the "piano roll" of beatbox activations may or may not be understandable by most persons and therefore the "piano roll" of beatbox activations may be provided to the beatbox decoder 318 to generate a beatbox transcript 336 as output 332. The beatbox transcript 336 may generally be understood by most persons, may be reproduced by most persons, and/or may be utilized to synthesize beatbox sounds utilizing a DAW for example. In some examples, the beatbox transcript 336 may be output in a MIDI format.

Figure 4:
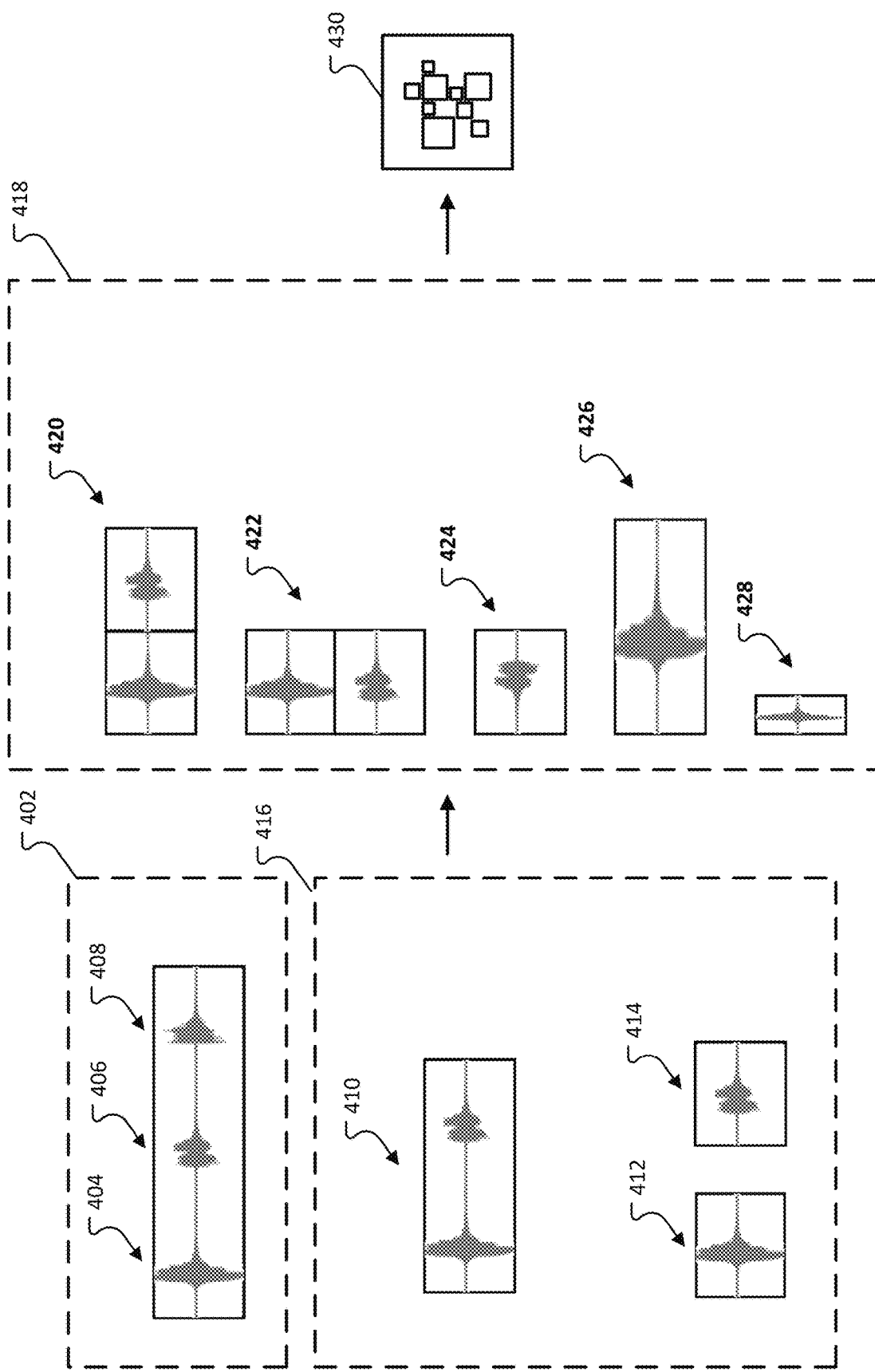
FIG. 4 depicts additional details directed to generating training samples in accordance with examples of the present disclosure.

FIG. 4 depicts additional details directed to generating training samples in accordance with examples of the present disclosure. More specifically, as the dataset for beatbox audio clips may be limited, a training sample generator, such as the training sample generator 322 may generate additional training samples to augment an existing data set of training samples. More specifically, training samples received from a training sample dataset may be split, rearranged, flipped, or otherwise modified to generate a plurality of additional training samples. As an example, a training sample 402 may represent a training sample received from a dataset. The training sample 402 may include a plurality of beatbox sounds 404, 406, and 408. In examples, each of the beatbox sounds 404, 406, 408, etc . . . may be split from one another (e.g., 410), rearranged with other beatbox sounds, and/or presented as an isolated training sample 412 and/or 414 for example. Thus, in addition to the training sample 402, the training samples 416 may be used for training the neural network. In addition, other combination of audio clips may be generated from one or more audio clips in a dataset. In examples, the training samples 418 may include an audio clip 420 of two or more beatbox sounds from different audio clips in the dataset, may include two or more audio clips 422 superimposed on each other in the time domain, may include a reversed or flipped sound 424, an elongated sound 426, and/or a compressed sound 428. The plurality of training samples 402, 416, and/or 418 may be provided as training data 430 and may be used to train the neural network.

Figure 5:
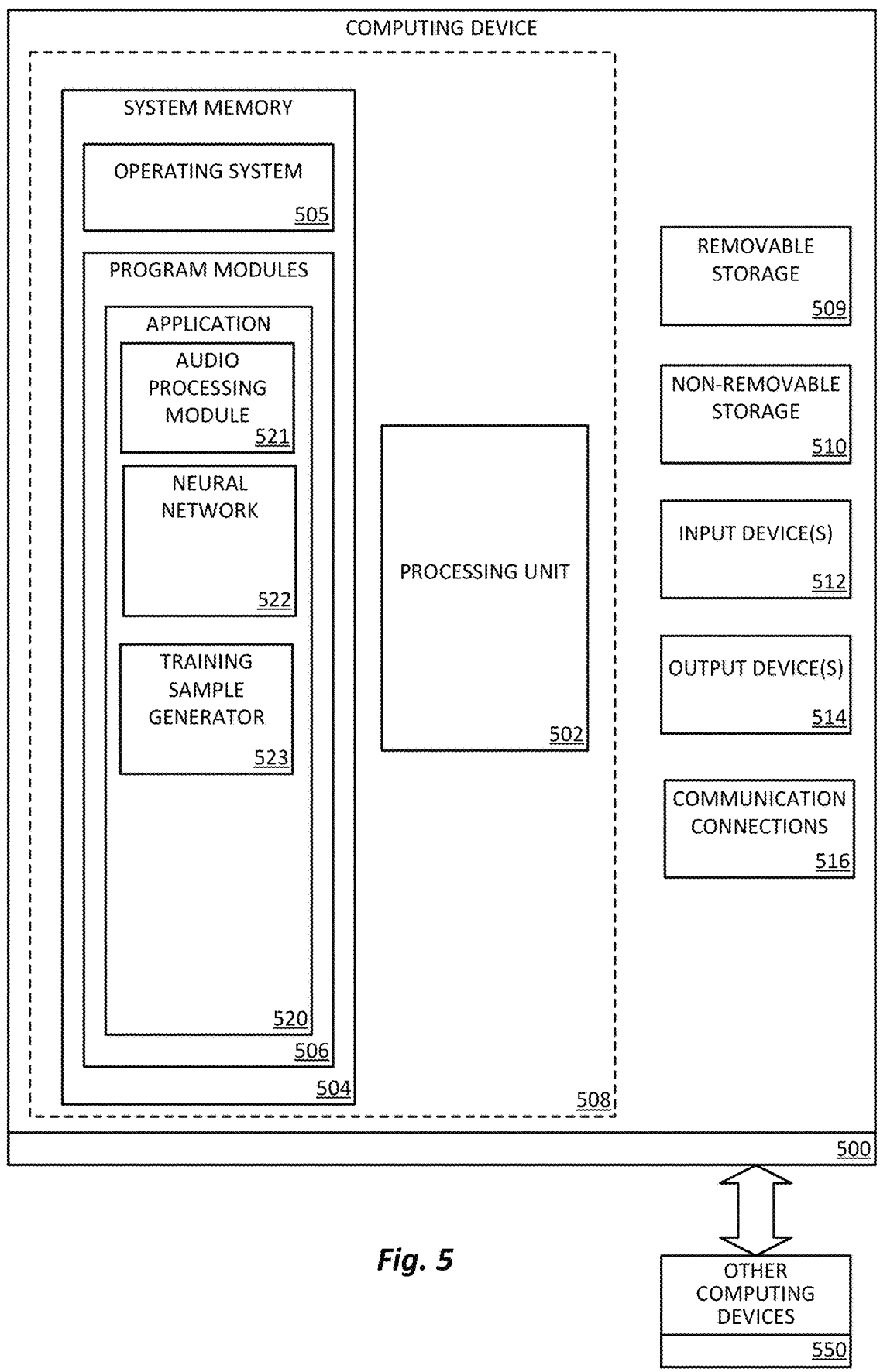
FIG. 5 depicts a block diagram illustrating physical components (e.g., hardware) of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. For example, the computing device 500 may represent the computing device 106 of FIG. 1 and/or the computing device 302 of FIG. 3. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for performing the various aspects disclosed herein such. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, several program modules and data files may be stored in the system memory 504. While executing on the at least one processing unit 502, the application 520 or the program modules 506 may perform processes including, but not limited to, one or more aspects, as described herein. The application 520 includes an audio processing module 521, a neural network 522, and/or a training sample generator 523, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. An output 514, corresponding to a virtual display may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
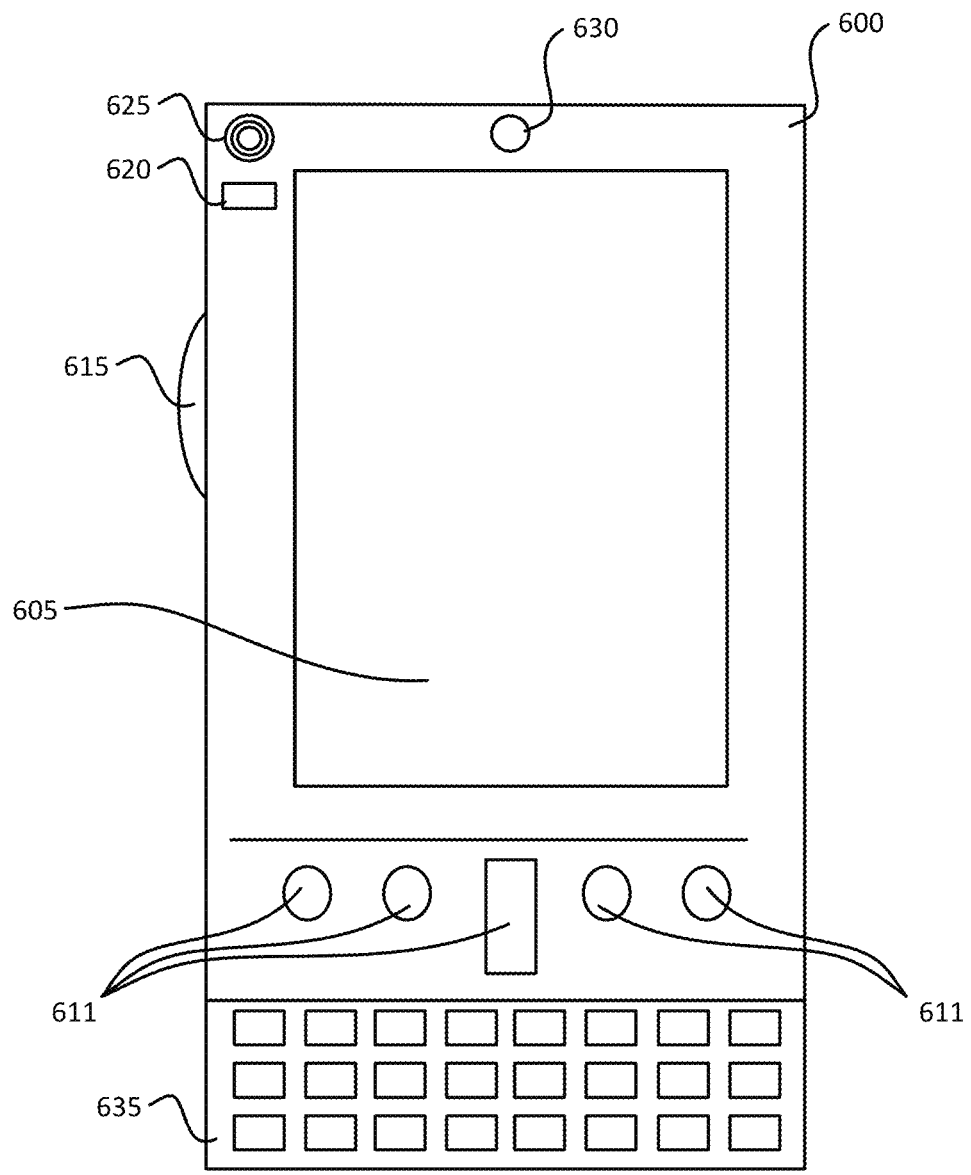
FIG. 6A illustrates a first example of a computing device with which aspects of the disclosure may be practiced.
Figure 6B:
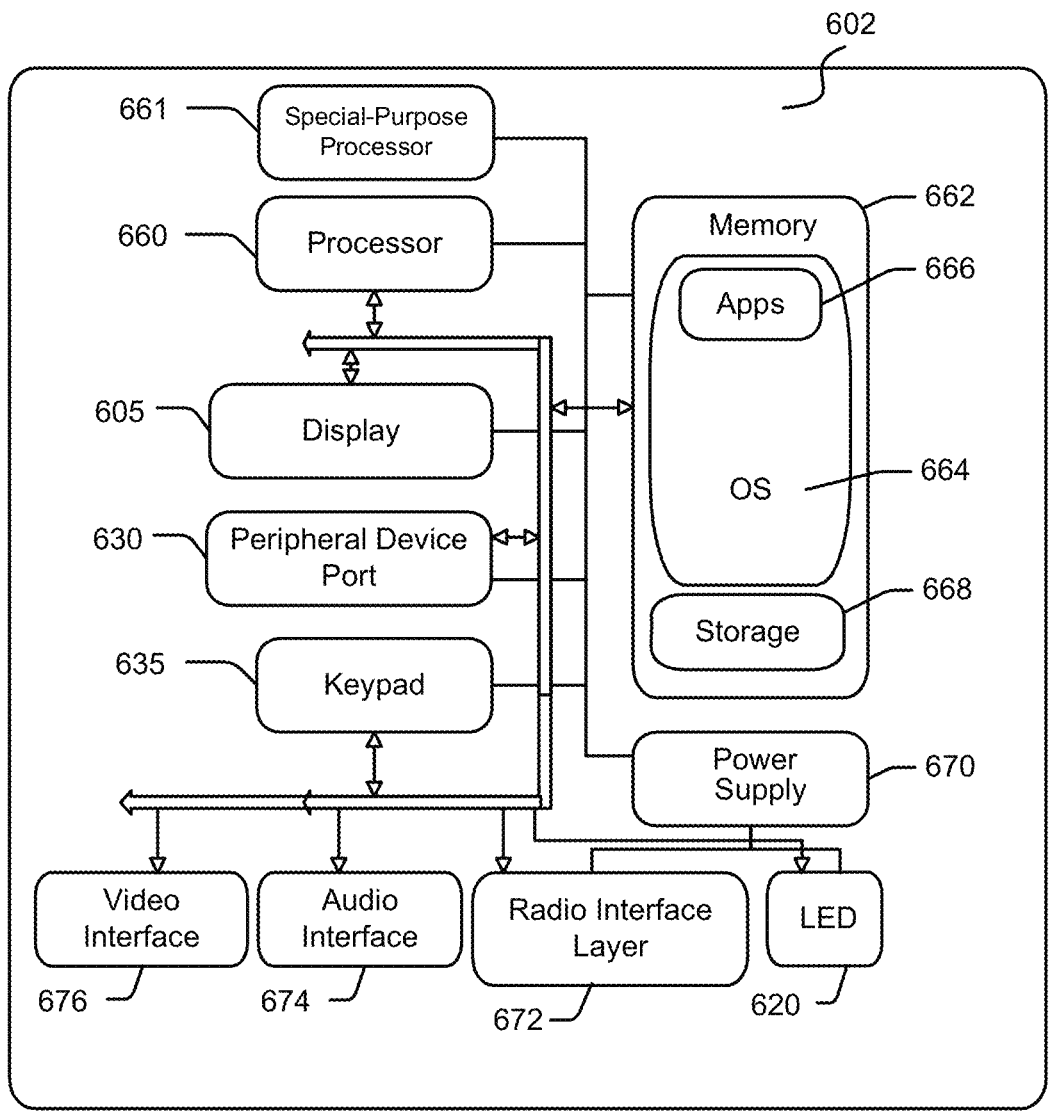
FIG. 6B illustrates a second example of a computing device with which aspects of the disclosure may be practiced.

FIGS. 6A and 6B illustrate a computing device or mobile computing device 600 suitable for performing the various aspects disclosed herein, for example, a mobile telephone, a smart phone, wearable computer (such as a smart watch), a tablet computer, a laptop computer, a smart home appliance, and the like, with which aspects of the disclosure may be practiced. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 611 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports 630, such as an audio input (e.g., a microphone jack), an audio output (e.g., a headphone jack), and a video output (e.g., a HDMI port) for sending signals to or receiving signals from an external source.

FIG. 6B is a block diagram illustrating the architecture of one aspect of computing device, a server, or a mobile computing device. That is, the mobile computing device 600 can incorporate a system (602) (e.g., an architecture) to implement some aspects. The system 602 can implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and/or one or more components supported by the systems described herein. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g. an audio processing module 521, a neural network 522, and a training sample generator 523, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated configuration, the visual indicator 620 is a light emitting diode (LED) and the audio transducer 625 is a speaker. These devices may be directly coupled to the power supply 670 so that when activated, they remain on for a duration dictated by the notification mechanism even though the processor 660/661 and other components might shut down for conserving battery power. In examples, the processor 661 may be a special-purpose processors, such as but not limited to a graphical processing unit (GPU) or a neural processing engine (NPE). The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 602 may further include a video interface 676 that enables an operation of an on-board camera to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
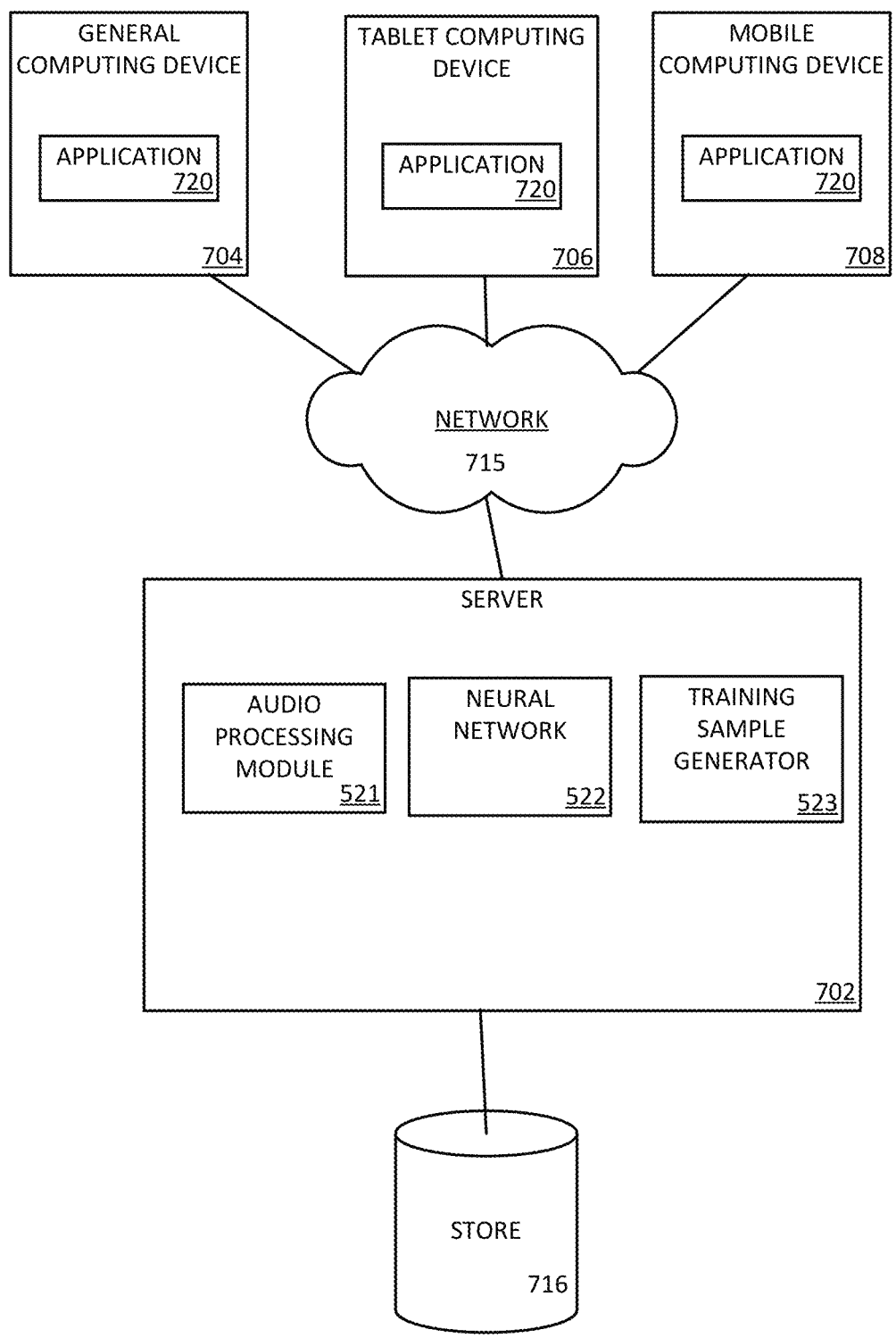
FIG. 7 illustrates at least one aspect of an architecture of a system for processing data in accordance with examples of the present disclosure.

FIG. 7 illustrates one aspect of the architecture of a system for processing data received at a computing system, suitable for performing the various aspects disclosed herein, from a remote source, such as a personal computer 704, tablet computing device 706, or mobile computing device 708, as described above. Content displayed at server device 702 may be stored in different communication channels or other storage types. For example, the computing device 704, 706, 708 may represent the computing device 106 of FIG. 1, and the server device 702 may represent a computing device, such as the computing device 106 of FIG. 1.

In some aspects, one or more of an audio processing module 521, neural network 522, and/or the training sample generator 523, may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone), each of which may include one or more application programs 720. Any of these aspects of the computing devices may obtain content from the store 716, in addition to receiving graphical data useable to be either pre-processed at a graphic-originating system, or post-processed at a receiving computing system. The content store 716 may include beatbox transcripts, beatbox audio clips, and/or model parameters as described herein.

FIG. 7 illustrates an exemplary mobile computing device 708 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera and/or microphone) functionality for capturing and interpreting user gestures for controlling the functionality of the computing device, and the like.

Figure 8:
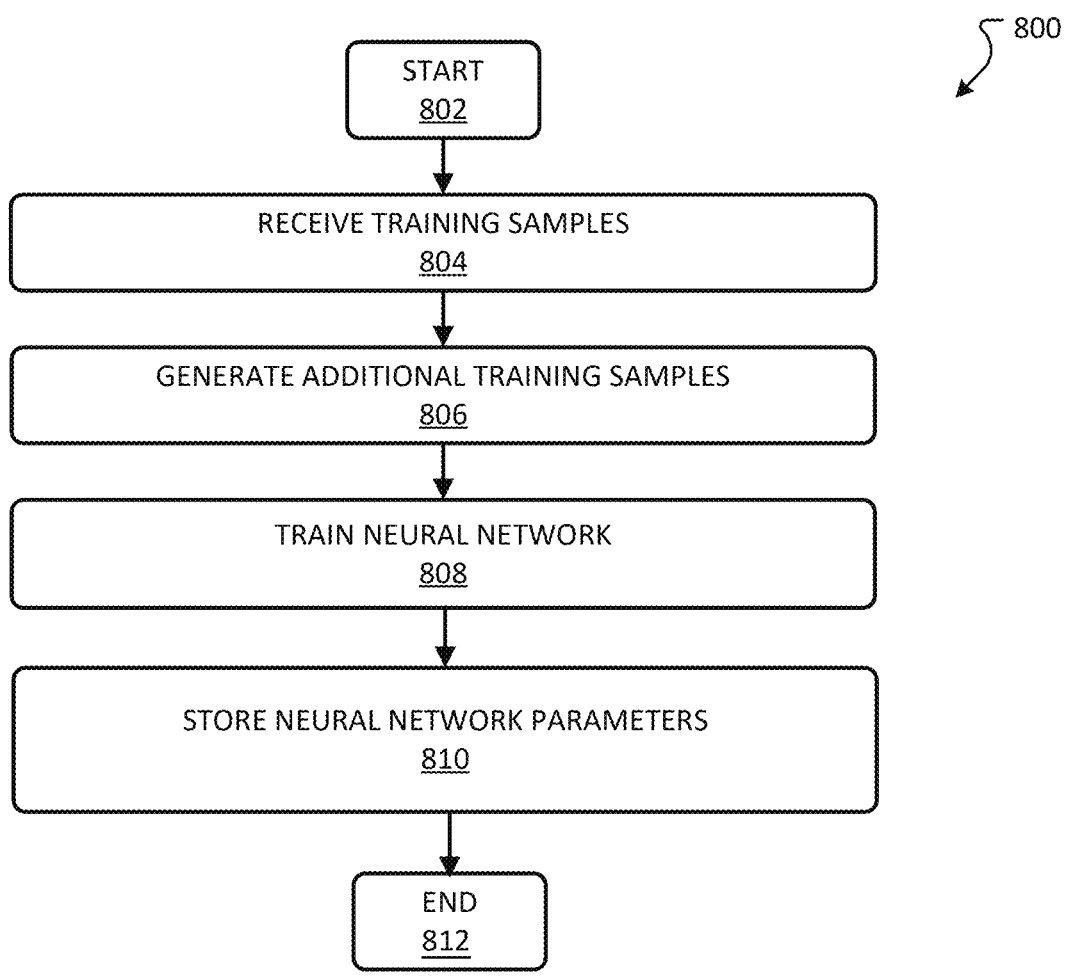
FIG. 8 depicts details of a simplified method for training a neural network model in accordance with examples of the present disclosure.

Referring now to FIG. 8, a simplified method for training a neural network of the automatic beatbox transcription system 100 is described in accordance with examples of the present disclosure. A general order for the steps of a method 800 is shown in FIG. 8. Generally, the method 800 starts at 802 and ends at 812. The method 800 may include more or fewer steps or may arrange the order of the steps differently than those shown in FIG. 8. The method 800 can be executed as a set of computer-executable instructions executed by a computer system and encoded or stored on a computer readable medium. In the illustrative aspect, the method 800 is executed by a computing device (e.g., 104) associated with a user (e.g., 102). However, it should be appreciated that aspects of the method 800 may be performed by one or more processing devices, such as a computer (e.g., 104) or server. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method 800 starts at 802, where flow may proceed to 804. At 804, the computing device receives a plurality of training samples. The plurality of training samples may include one or more beatbox sounds. The method may proceed to 806, where a training sample generator may generate a plurality of synthesized training samples based on the plurality of training samples received at 804. For example, the plurality of training samples may be split, rearranged, flipped, or otherwise modified to generate a plurality of additional training samples. As an example, a training sample may include a plurality of beatbox sounds and each of the beatbox sounds may be split from one another, rearranged with other beatbox sounds, and/or presented as an isolated training sample. In some examples, other combinations of audio clips may be generated from one or more audio clips in a dataset. For example, the plurality of training samples may include an audio clip of two or more beatbox sounds from different audio clips in the dataset, may include two or more audio clips superimposed on each other in the time domain, may include a reversed or flipped sound, an elongated sound, and/or a compressed sound. Thus, a plurality of synthesized or otherwise generated training samples may be provided as training data and may be used to train the neural network.

At 808, the neural network may be trained. For example, neural network weights may be initialized to a random value, such that when the weights are changed during the training process, a loss function, or value associated with a loss function, utilized during the training process may be improved. In examples, an algorithms that optimizes the training process functions may include gradient descent, but others are contemplated herein. At 810, the model weights, hyper parameters (e.g., learning rate, size, etc.) may be stored as a model parameter file and used later for generating beatbox transcripts as previously described. The method 800 may end at 812.

Figure 9:
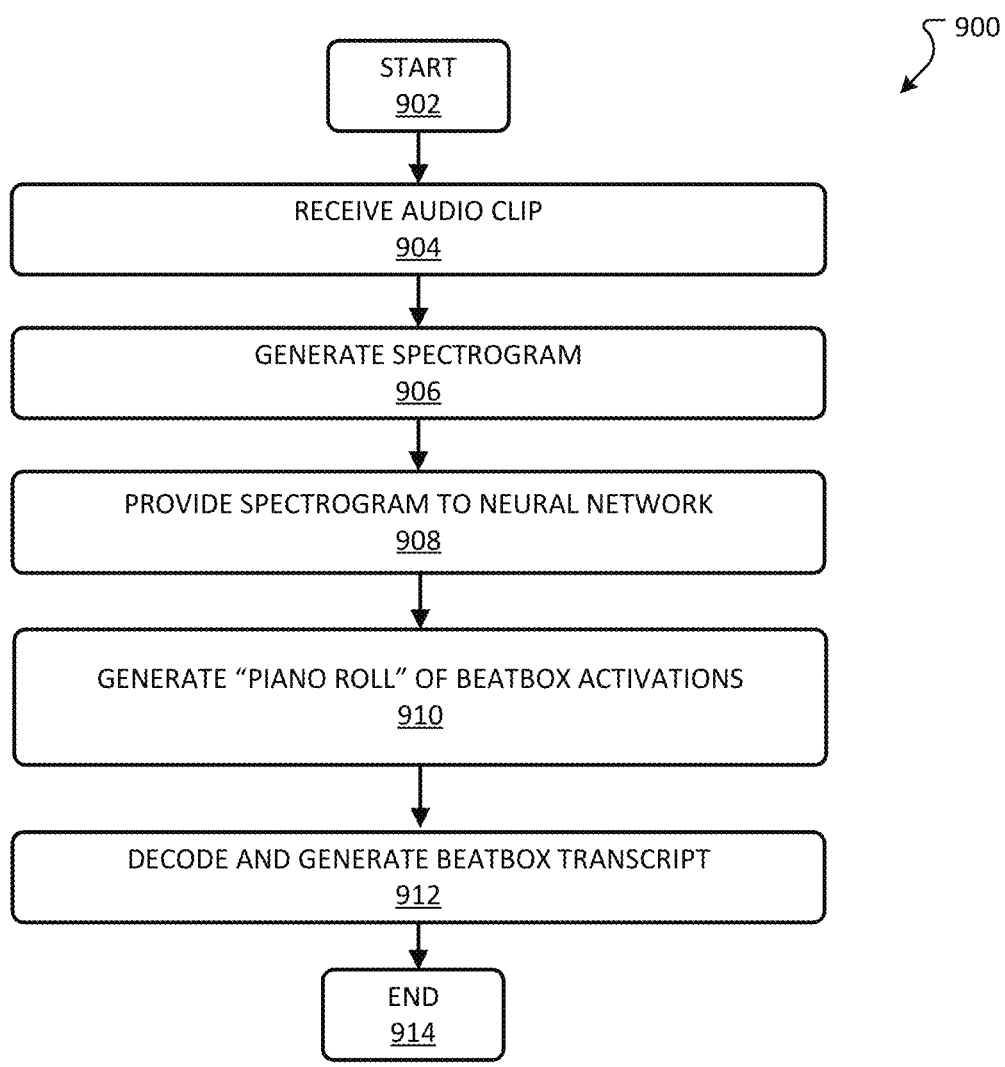
FIG. 9 depicts details of a simplified method for generating a beatbox transcription in accordance with examples of the present disclosure.

Referring now to FIG. 9, a simplified method for generating a beatbox transcript using the automatic beatbox transcription system 100 is described in accordance with examples of the present disclosure. A general order for the steps of a method 900 is shown in FIG. 9. Generally, the method 900 starts at 902 and ends at 914. The method 900 may include more or fewer steps or may arrange the order of the steps differently than those shown in FIG. 9. The method 900 can be executed as a set of computer-executable instructions executed by a computer system and encoded or stored on a computer readable medium. In the illustrative aspect, the method 900 is executed by a computing device (e.g., 104) associated with a user (e.g., 102). However, it should be appreciated that aspects of the method 900 may be performed by one or more processing devices, such as a computer (e.g., 104) or server. Further, the method 900 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-8.

The method 900 starts at 902, where flow may proceed to 904. At 904, the computing device receives an audio clip, such as the audio clip 104 (FIG. 1). The audio clip may include one or more audio signals corresponding to one or more beatbox sounds. The method 900 may proceed to 906, where a spectrogram of the one or more audio signals corresponding to the one or more beatbox sounds may be generated. That is, a spectrogram representing a spectrum of frequencies of the audio signal as the audio signal varies with time is generated. At 908, the resulting spectrogram may then be provided to a neural network for additional processing. At 910, the neural network may generate a "piano roll" of beatbox activations. The "piano roll" of beatbox activations may include activation times for a plurality of beatbox sounds over the course of a song, frame, melody, etc. presented in the audio clip. In some examples, the "piano roll" of beatbox activations may be output as a vector representation, in digital format, as an image, etc. As this "piano roll" of beatbox activations may or may not be understandable by most persons, the automatic beatbox transcription system may process the "piano roll" of beatbox activations using a decoder at 912 to decode and generate a beatbox transcript that is generally understood by most persons, may be reproduced by most persons, and/or may be utilized to synthesize beatbox sounds utilizing a DAW for example. In some examples, the transcript may be output in a MIDI format. The method 900 may end at 914.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for generating a beatbox transcript according to at least the examples provided in the sections below:

(A1) In one aspect, some examples include a method for generating a beatbox transcript. The method may include receiving an audio signal having beatbox sounds, wherein the beatbox sounds include beatbox vocals; generating a spectrogram of the audio signal; generating a beatbox sound activation map including a plurality of activation times for a plurality of beatbox sounds based on the spectrogram of the audio signal; decoding the beatbox sound activation map into a beatbox transcript; and providing the beatbox transcript as an output, wherein the beatbox transcript includes instrumental music matching the beatbox sound activation map.

(A2) In some examples of A1, the method further includes processing the spectrogram of the audio signal with a neural network model trained on training samples that include beatbox sounds, wherein the neural network model includes a convolutional neural network and a recurrent neural network.

(A3) In some examples of A1-A2, the beatbox transcript is provided in a Musical Instrument Digital Interface (MIDI) format.

(A4) In some examples of A1-A3, the method further includes receiving an audio signal directly from a microphone.

(A5) In some examples of A1-A4, the beatbox transcript includes one or more of a hi-hat, snare, or kick.

(A6) In some examples of A1-A5, the training samples include a plurality of training samples synthesized from other non-synthesized training samples.

(A7) In some examples of A1-A6, the method further includes generating the plurality of training samples synthesized from other non-synthesized training samples by at least one of reversing a beatbox sound, combining a beatbox sound with another beatbox sound, separating one or more beatbox sounds from a same sound clip.

In yet another aspect, some examples include a computing system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a beatbox transcript, the method comprising:
receiving an audio signal having a plurality of beatbox sounds, wherein the plurality of beatbox sounds include beatbox vocals;
generating a spectrogram of the audio signal;

generating a beatbox sound activation map including a plurality of activation times for the plurality of beatbox sounds based on the spectrogram of the audio signal, further comprising processing the spectrogram of the audio signal with a neural network model trained on training samples that include sample beatbox sounds to generate the beatbox sound activation map including the plurality of activation times;

decoding the beatbox sound activation map into a beatbox transcript; and providing the beatbox transcript as an output, wherein the beatbox transcript includes instrumental music matching the beatbox sound activation map.

2. The method of claim 1, wherein the neural network model includes a convolutional neural network and a recurrent neural network.

3. The method of claim 1, wherein the beatbox transcript is provided in a Musical Instrument Digital Interface (MIDI) format.

4. The method of claim 1, further comprising receiving the audio signal directly from a microphone.

5. The method of claim 1, wherein the beatbox transcript includes one or more of a hi-hat, snare, or kick.

6. The method of claim 1, wherein the training samples include a plurality of training samples synthesized from other non-synthesized training samples.

7. The method of claim 6 further comprising generating the plurality of training samples synthesized from other non-synthesized training samples by at least one of reversing at least one of the sample beatbox sounds, combining at least one of the sample beatbox sounds with another sample beatbox sound, separating one or more of the sample beatbox sounds from a same sound clip.

8. A system, comprising:
one or more hardware processors configured by machine-readable instructions to:
receive an audio signal having a plurality of beatbox sounds, wherein the plurality of beatbox sounds include beatbox vocals;
generate a spectrogram of the audio signal;
generate a beatbox sound activation map including a plurality of activation times for the plurality of beatbox sounds based on the spectrogram of the audio signal by processing the spectrogram of the audio signal with a neural network model trained on training samples including sample beatbox sounds;
decode the beatbox sound activation map into a beatbox transcript; and
provide the beatbox transcript as an output, wherein the beatbox transcript includes instrumental music matching the beatbox sound activation map.

9. The system of claim 8, wherein the neural network model includes a convolutional neural network and a recurrent neural network.

10. The system of claim 8, wherein the beatbox transcript is provided in a Musical Instrument Digital Interface (MIDI) format.

11. The system of claim 8, wherein the one or more hardware processors are further configured by machine-readable instructions to receive the audio signal directly from a microphone.

12. The system of claim 8, wherein the beatbox transcript includes one or more of a hi-hat, snare, or kick.

13. The system of claim 8, wherein the training samples include a plurality of training samples synthesized from other non-synthesized training samples.

14. The system of claim 13, wherein the one or more hardware processors are further configured by machine-readable instructions to: generate the plurality of training samples synthesized from other non-synthesized training samples by at least one of reversing at least one of the sample beatbox sounds, combining at least one of the sample beatbox sounds with another sample beatbox sound, separating one or more of the sample beatbox sounds from a same sound clip.

15. A non-transient computer-readable storage medium comprising instructions being executable by one or more processors, that when executed by the one or more processors, cause the one or more processors to:
receive an audio signal having a plurality of beatbox sounds, wherein the plurality of beatbox sounds include beatbox vocals;
generate a spectrogram of the audio signal;
generate a beatbox sound activation map including a plurality of activation times for the plurality of beatbox sounds based on the spectrogram of the audio signal by processing the spectrogram of the audio signal with a neural network model trained on training samples including sample beatbox sounds;
decode the beatbox sound activation map into a beatbox transcript; and
provide the beatbox transcript as an output, wherein the beatbox transcript includes instrumental music matching the beatbox sound activation map.

16. The computer-readable storage medium of claim 15, wherein the neural network model includes a convolutional neural network and a recurrent neural network.

17. The computer-readable storage medium of claim 15, wherein the beatbox transcript is provided in a Musical Instrument Digital Interface (MIDI) format.

18. The computer-readable storage medium of claim 15, wherein the at least one memory and the computer program code are further configured to, with the processor, cause the computer-readable storage medium to receive the audio signal directly from a microphone.

19. The computer-readable storage medium of claim 15, wherein the beatbox transcript sounds includes one or more of a hi-hat, snare, or kick.

20. The computer-readable storage medium of claim 15,
wherein the training samples include a plurality of training samples synthesized from other non-synthesized training samples; and
wherein the computer-readable storage medium includes instructions configured to cause the one or more processors to generate the plurality of training samples synthesized from other non-synthesized training samples by at least one of reversing at least one of the sample beatbox sounds, combining at least one of the sample beatbox sounds with another sample beatbox sound, separating one or more of the sample beatbox sounds from a same sound clip.

* * * * *